(No Model.) 2 Sheets—Sheet 1.

F. A. BROWNELL.
PHOTOGRAPHIC CAMERA.

No. 442,216. Patented Dec. 9, 1890.

Witnesses
J. Watson Sims
Thomas Durant

Inventor
Frank A. Brownell
by Church & Church
his Attys (No Model.) 2 Sheets—Sheet 2.
F. A. BROWNELL.
PHOTOGRAPHIC CAMERA.
No. 442,216. Patented Dec. 9, 1890.
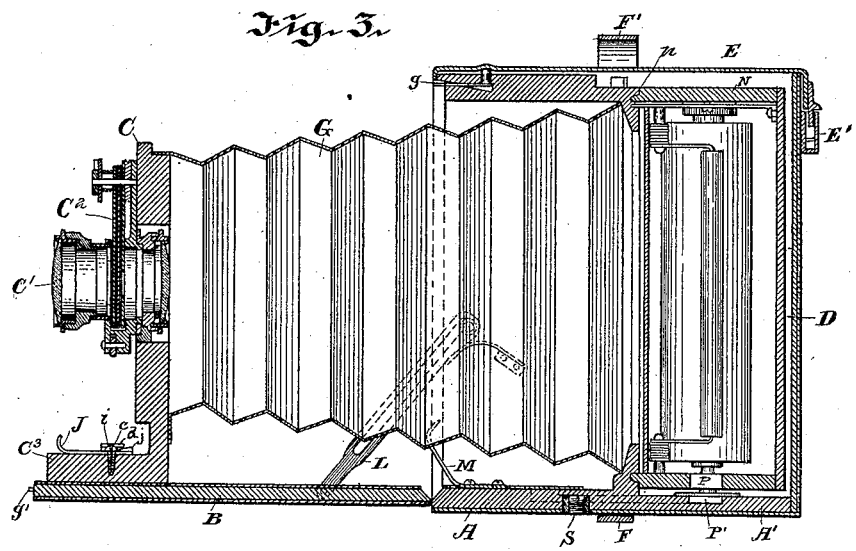
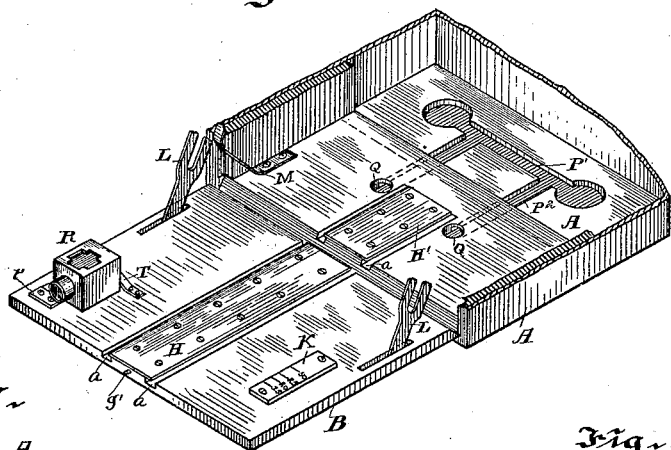
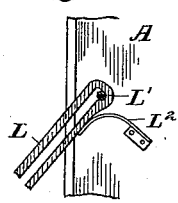
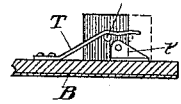
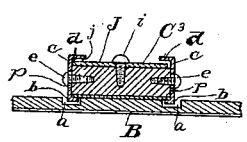
Witnesses
J Watson Sims
Thomas Durant
Inventor
Frank A. Brownell
by Church & Church
his Attys

United States Patent Office.

FRANK A. BROWNELL, OF ROCHESTER, NEW YORK, ASSIGNOR, BY MESNE ASSIGNMENTS, TO THE EASTMAN COMPANY, OF SAME PLACE.

PHOTOGRAPHIC CAMERA.

SPECIFICATION forming part of Letters Patent No. 442,216, dated December 9, 1890.

Application filed December 24, 1889. Serial No. 334,803. (No model.)

*To all whom it may concern:*

Be it known that I, FRANK A. BROWNELL, of the city of Rochester, county of Monroe, and State of New York, have invented certain new and useful Improvements in Photographic Cameras; and I do hereby declare the following to be a full, clear, and exact description of the same, reference being had to the accompanying drawings, forming a part of this specification, and to letters of reference marked thereon.

My present invention has for its object to provide a camera that can be folded within small compass for carrying and can be so extended as to take quite a large picture; and it further has for its object to provide said cameras with means for utilizing roller-holders for flexible film, thereby providing a comparatively small detective camera which is not only capable of taking large pictures, but also of containing sufficient material for a large number of them, these being the objects most sought after in articles of this description.
To these and other ends the invention consists in certain novelties of construction and combinations of parts, all as will be hereinafter described, and the novel features pointed out in the claims at the end of this specification.

Figure 1:
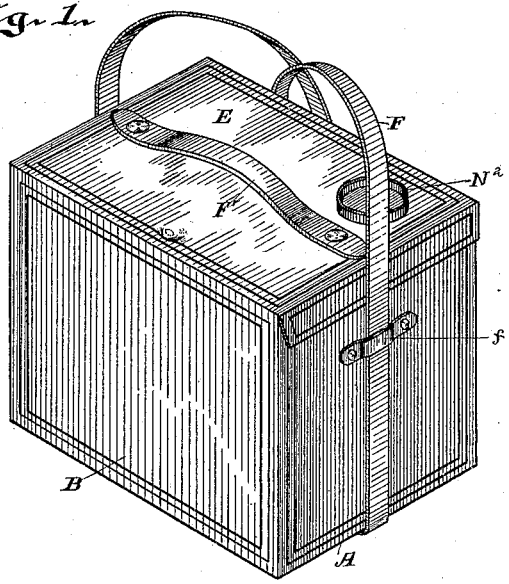
Figure 2:
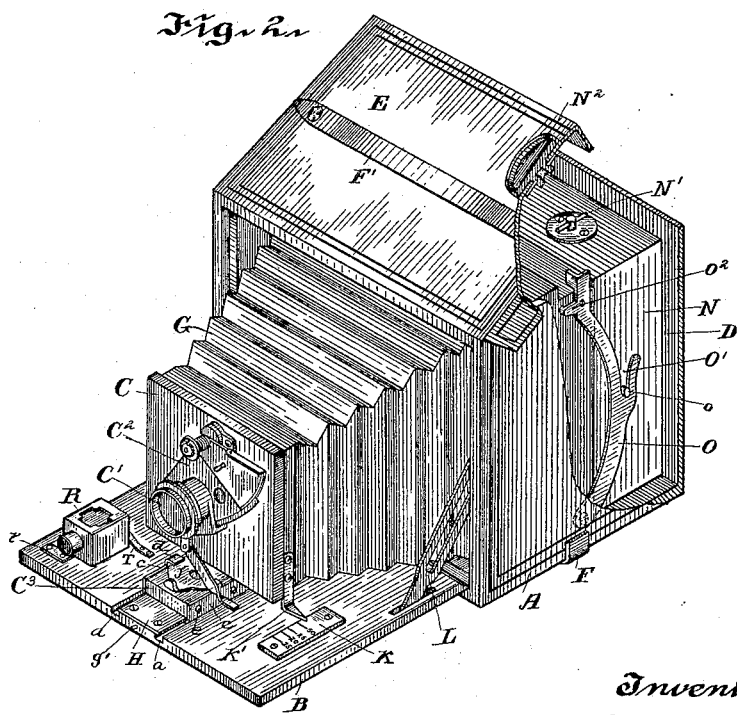

In the drawings, Figure 1 is a perspective view showing the camera ready for transportation; Fig. 2, a view of the camera extended, the casing at the rear being broken away to show the construction of the parts; Fig. 3, a longitudinal sectional view of the camera extended; Fig. 4, a sectional perspective view of the bottom of the camera, and Fig. 5 a cross-sectional view showing the manner of locking the camera-front to the bed; Fig. 6, a view of the finder, and Fig. 7 a view of one of the door-supporting links.

Similar letters of reference in the several figures indicate similar parts.
The camera-body consists of a main frame A, open at the rear and closed at the front by a door B, hinged to the bottom of the frame and when folded down constituting the bed on which the camera-front C slides. The bottom A' of frame A is extended to the rear, as shown, and forms a support for a casing D, preferably inclosing the rear of the camera, while the top is protected by a cover E, hinged at the forward portion and fastened at the rear by a lock or catch E', being capable of being lifted, as shown in Fig. 2, to expose the top of the roller-holder and permit access to the back of the frame A when desired. A suitable carrying-strap F is passed around the camera-body, being confined by loops $f$, and a handle F' is secured to the top, as shown.

The camera-front C, carrying the lens C' and shutter $C^2$, is connected to the inside of the frame A by the bellows G, and is arranged to slide in ways on the base of frame A when within the camera-casing and upon the upper side of the door B when the latter is down. While this way may be of any desired construction, I prefer to form it of plates H H', connected to the door and base, respectively, small grooves $a\ a$ being formed at its edges, as shown, for the accommodation of the flanges or ears $b\ b$, formed upon guiding and clamping plates $c\ c$, mounted on the sides of the extension $C^3$ of the front C. The plates $c\ c$ are provided at the top with flanges $d\ d$, and are secured to the sides of extension $C^3$ by screws $e\ e$, passing through elongated slots $p\ p$ and entering said extension. Pivoted upon the upper side of extension $C^3$ is a plate J, having an operating projection or handle and bent up on diagonally-opposite corners to form cam-ears $j$, over which the flanges $e\ e$ project, so that when said plate is turned on its pivotal pin or screw $i$ said cams will engage and raise plates $c\ c$, clamping the lens-carrying front to the plate H or H', said plates therefore constituting guide and clamping plates, as will be understood, so that the camera can be readily focussed by turning the plate to loosen the clamping-plates, then adjusting the front on its ways, and turning the plate to clamp it firmly to its support.

As it is designed to use this as a detective camera, dispensing with a ground focussing-glass, I locate a suitable index-plate K on the inside of door B and provide an index K' on the camera-front, co-operating with it, so that the distance of the object to be photographed being known or approximated the appropriate focus can readily be had.

The door B is held in proper position when open by suitable slotted links L, pivoted to it and co-operating with stop-pins L', secured to the case through the slots. At the inner ends the slots in these plates are slightly enlarged, and secured to the frame A are springs L² L², normally pressing said links L upward, so that when the door is open they will be forced upward with the pins L' in the recesses at the ends and held, thereby preventing the closing of the cover without first pressing said links down, removing the recesses from engagement with the pins. When the door B is closed, it is fastened by a spring-catch $g$ at the top, engaging a pin $g'$ thereon, the operating end of the pin being beneath the cover, but capable of operation therethrough, and said door is forced open when released from the catch by springs M, secured to the frame A and operating directly against it.

The parts so far described are capable of use upon any of the ordinary folding cameras now in use, whether closed at the rear or not; but as it is desirable to use a roller-holder for film in the present camera, and, further, to have it covered and capable of vertical insertion and removal, I provide the casing, as before described, forming a chamber at the back of frame A, completely inclosed, and in this locate the roller-holder.

N indicates the roller-holder casing, containing the ordinary film holding and feeding devices, and N' the operating-handle of the winding-reel. Projecting to the outside and upon the lid or cover E is a button or disk N², projecting through and having on its inside a slot, which co-operates with said handle, so that the film may be fed forward without opening the cover.

The indicating device for notifying the operator when an exposure of film is wound forward may be of any description, either arresting the winding devices or it may be one of the audible kind making a sharp click for each or any number of the revolutions of the measuring-roller.

The front of the roller-holder casing is provided with a bead $n$, which it is desirable to have fit against or into the back of frame A, so that there will be no possibility of light leaking in and spoiling the film, and for the purpose of providing means for inserting the roller-holder from the top and of moving it in squarely with the bead $n$ in the recess in the frame I provide on each end arms O, pivoted to the frame A, preferably curved, as shown, and having slots O' on their outer portion, with which co-operate pins $o$ on the holder ends, the parts being so arranged that the holder can be placed in the case with the pins in the slots, and when the plates are turned up to the position shown in Fig. 2 the holder will be pressed up light-tight in proper position. The upper ends of arms O are provided with projections O², co-operating with suitable recesses in the sides of the frame A when the holder is in proper position, preventing its accidental removal, and said arms are sufficiently elastic to hold the projections normally in engagement. The extreme ends project above the casing A in convenient position to be manipulated by the operator to insert and remove the roller-holder when desired.

In cameras employing roller-holders not having covering sides or plate-holders which are applied before the camera is focused it is difficult to employ bellows between the lens-frame and holder, for the reason that when the bellows is rapidly drawn out it will collapse, there being no aperture for admitting air to its interior save through the interstices between the holder and camera-back, which are exceedingly small in a properly-constructed instrument. This objection is of course more apparent in a folding camera where it is necessary to draw the lens out quite a distance in order to obtain the first focus, and for the purpose of overcoming it I provide a channel or passage to the external air from the interior of the camera which will permit the ingress of air without admitting light to fog the plate or film. In the present embodiment of my invention, as the roller-holder has a large space behind the film-support, I prefer to form an opening P in the bottom, which, when the holder is in proper position, registers with a channel P', connected by channels P² P² with suitable apertures Q in the base beneath the bellows, as shown, or at any other point. By this arrangement it will be seen the camera-front can be extended or closed within the casing without liability of the bellows collapsing or getting out of shape by the pressure of the air.

Pivoted to the door B is a finder R, consisting of a casing with a lens, mirror, and ground glass, as usual, the supporting-brackets $r$ $r$ being preferably located at one corner of said casing, whereby it can be turned, as indicated in Fig. 2, with the ground glass on top, or be turned over so as to present the glass at the side if the camera is supported on a tripod, as may be done by a securing-screw entering the nut or aperture S in the camera-base, as in Fig. 3. A spring T, secured to door B, operates on a pin $t$ on the finder-casing to hold it against the door in whichever position it may be adjusted, as in Fig. 6.

The shutter employed may be of any desired construction; but it is preferably such a one as will not open the lens-opening while being set, as there is no slide interposed between the latter and the film, though of course a suitable slide could be employed, if desired.

The manner of using the camera will be apparent to those skilled in the art, and no further description is therefore necessary.

I claim as my invention—

1. In a photographic camera, the combination, with a camera body or frame and an inclosing-casing therefor having a lid at the top, of a door forming when closed a part of the casing and when open a support for the camera-front, and a chamber within the casing accessible from the top, and a holder for sensitized material contained in said chamber, substantially as described.

2. In a photographic camera, the combination, with a camera body or frame, an inclosing-casing having a chamber at the rear, and a lid or cover therefor, of a holder for sensitized material adapted to be applied to the back of the frame, and a support or supports for securing said holder and moving it squarely against the back of the frame, substantially as described.

3. In a camera, the combination, with a camera back or frame and a removable holder for sensitized material, arranged to co-operate with said back, of a support on which the holder is mounted, movable toward and from the camera-back so as to cause said holder to make a light-tight connection with the camera-back, substantially as described.

4. In a photographic camera, the combination, with a camera back or frame, of a holder for sensitized material, arranged to co-operate with said back and make a light-tight joint, and the pivoted arms detachably engaging this holder and constituting a support, whereby it may be moved toward and from the back, substantially as described.

5. In a photographic camera, the combination, with a camera body or frame, of a holder for sensitized material, having the bead thereon, and the pivoted arms constituting a support for the holder movable toward and from the frame, substantially as described.

6. In a photographic camera, the combination, with a camera body or frame, of a holder for sensitized material, the pivoted arms constituting a support for the holder, and spring-catches for holding said arms in position, substantially as described.

7. In a photographic camera, the combination, with the camera back or frame, of a holder for sensitized material, having the pins thereon, and the arms pivoted to the frame, having the open slots constituting supports for said holder, and movable toward and from the frame, substantially as described.

8. In a photographic camera, the combination, with the camera body or frame, of a holder for sensitized material, having the pins thereon, the curved arms pivoted to the frame having the slots, and catches at the ends, substantially as described.

9. In a photographic camera, the combination, with the way, of a camera-front sliding thereon, the plate at the side, having flanges on top and bottom, and the cam-plate pivoted on the camera-front, adapted to engage one of the flanges and clamp the other to the way, substantially as described.

10. In a camera, the combination, with a plate constituting a way, of a camera-front sliding thereon, the two guiding and clamping plates having the flanges engaging the lower side of the way, and a cam-plate pivoted on the camera-front and engaging both plates for clamping them to the way, substantially as described.

11. In a photographic camera, the combination, with a plate constituting a way, of a camera-front sliding thereon, the two guiding and clamping plates arranged on opposite sides, having the flanges on top and bottom, and a cam-plate pivoted to the front, having the cams on opposite sides for engaging the upper flanges and causing the lower ones to clamp the way-plate, substantially as described.

12. The combination, with a camera-casing having a hinged lid or cover, of a roller-holder located within said casing, having an operating-handle, and a button or handle secured to the casing-cover, co-operating with the one on the holder when said lid is closed, substantially as described.

13. In a photographic camera, the combination, with a back or frame, a front carrying a lens and relatively movable thereto, and a holder for sensitized material fitted to said back, of a circuitous passage for admitting air to the interior of the camera when the front is adjusted, but preventing the access of light, substantially as described.

14. In a photographic camera, the combination, with a camera back or frame, a front carrying a lens connected to the back by a bellows and relatively movable thereto, and a holder for sensitized material applied to the camera-back, of a circuitous passage for admitting air to the interior of the camera when the front is adjusted, but preventing the ingress of light, substantially as described.

15. In a photographic camera, the combination, with a camera back or frame, an adjustable front carrying a lens and connected to the back by a bellows, of a holder for sensitized material fitted to the back, having an aperture therein, and a circuitous air-passage in the camera-back communicating with the aperture in the holder when the latter is in position, substantially as described.

16. In a photographic camera, the combination, with a camera-casing, of a door hinged thereto and forming a support for the camera-front, the links pivoted to said door, having the slots and the recesses at their ends, the pins in the slots, and the springs operating said links laterally, substantially as described.

17. The combination, with a photographic camera, of a finder pivoted thereon at one corner and a spring co-operating therewith for holding it in two positions, substantially as described.

18. The combination, with a photographic camera, of a finder having a rectangular casing pivoted to the camera at one corner and having a pin thereon, and a spring co-operating with said pin for holding the finder with either of two sides in engagement with the camera, substantially as described.

19. In a camera, the combination, with the camera back or frame and a holder for sensitized material, arranged to co-operate with said camera-back, of a support upon which said holder is removably pivoted near its center, whereby the holder can be moved against said camera-back and make a light-tight joint therewith, substantially as described.

FRANK A. BROWNELL.

Witnesses:
 FRED F. CHURCH,
 S. E. TRUE.